United States Patent
Burkhardt et al.

(10) Patent No.: US 6,993,642 B2
(45) Date of Patent: Jan. 31, 2006

(54) METHOD AND SYSTEM FOR CREATING AND EMPLOYING AN OPERATING SYSTEM HAVING SELECTED FUNCTIONALITY

(75) Inventors: Ryan Burkhardt, Redmond, WA (US); Seetharaman Harikrishnan, Redmond, WA (US); Tom Yaryan, Seattle, WA (US); Richard Bond, Duvall, WA (US); Vijesh Shetty, Issaquah, WA (US); Vijayachandran Jayaseelan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 09/912,864

(22) Filed: Jul. 24, 2001

(65) Prior Publication Data

US 2003/0023839 A1    Jan. 30, 2003

(51) Int. Cl.
*G06F 15/177* (2006.01)
*G06F 9/445* (2006.01)

(52) U.S. Cl. ............................. 713/1; 713/2; 717/174
(58) Field of Classification Search ............... 713/1, 713/2, 100; 717/174, 175, 168; 710/10
See application file for complete search history.

(56) References Cited

U.S. PATENT DOCUMENTS

| | | | | |
|---|---|---|---|---|
| 5,142,680 | A | * | 8/1992 | Ottman et al. .............. 717/176 |
| 5,469,573 | A | * | 11/1995 | McGill et al. .............. 717/127 |
| 5,555,416 | A | * | 9/1996 | Owens et al. .............. 717/178 |
| 5,713,024 | A | * | 1/1998 | Halladay .................... 717/168 |
| 5,794,052 | A | | 8/1998 | Harding |
| 6,016,400 | A | * | 1/2000 | Day et al. ................... 717/175 |
| 6,080,207 | A | | 6/2000 | Kroening et al. |
| 6,138,179 | A | * | 10/2000 | Chrabaszcz et al. ......... 710/10 |
| 6,188,779 | B1 | | 2/2001 | Baum |
| 6,247,128 | B1 | | 6/2001 | Fisher et al. |
| 6,262,726 | B1 | | 7/2001 | Stedman et al. |
| 6,282,711 | B1 | | 8/2001 | Halpern et al. |
| 6,377,958 | B1 | | 4/2002 | Orcutt |
| 6,385,766 | B1 | | 5/2002 | Doran, Jr. et al. |
| 6,453,413 | B1 | | 9/2002 | Chen et al. |
| 6,512,526 | B1 | | 1/2003 | McGlothlin et al. |
| 6,532,474 | B2 | | 3/2003 | Iwamoto et al. |
| 6,598,223 | B1 | | 7/2003 | Vrhel, Jr. et al. |
| 6,681,323 | B1 | | 1/2004 | Fontanesi et al. |

(Continued)

FOREIGN PATENT DOCUMENTS

EP       0817014 A2     7/1997

(Continued)

OTHER PUBLICATIONS

IBM, Remote Software Installation Protocol, Mar. 1, 1992, vol. 34, Issue 10A, pp. 82-84.*

(Continued)

*Primary Examiner*—Thomas Lee
*Assistant Examiner*—Suresh K Suryawanshi
(74) *Attorney, Agent, or Firm*—Senniger Powers

(57) ABSTRACT

A system and method of creating and employing an operating system (OS) image having selected functionality. A user, such as an original equipment manufacturer (OEM) of personal computers (PCs) or an information technology professional, selects a set of OS components from a plurality of OS components available in an installation OS image. The selected set of OS components is installed as the OS image on a computer readable medium such as a CD-ROM. The OS image includes a script for interacting with the OS image to perform functions desired by a user, such as booting a destination computer and installing a reference OS image or recovering the destination computer from a failed installation of the reference OS image.

55 Claims, 5 Drawing Sheets

U.S. PATENT DOCUMENTS

| | | |
|---|---|---|
| 6,711,624 B1 | 3/2004 | Narurkar et al. |
| 2002/0188941 A1 | 12/2002 | Cicciarelli et al. |
| 2002/0194398 A1 | 12/2002 | Bentley et al. |
| 2003/0233379 A1 | 12/2003 | Cohen et al. |
| 2004/0070678 A1 | 4/2004 | Toyama et al. |
| 2004/0218902 A1 | 11/2004 | Yanagita |

FOREIGN PATENT DOCUMENTS

| | | |
|---|---|---|
| GB | 2334354 A | 8/1999 |
| JP | 09185494 A * | 7/1997 |
| WO | WO 99/49394 A1 | 9/1999 |
| WO | WO 99/59059 A1 | 11/1999 |

OTHER PUBLICATIONS

Solomon et al., Inside Microsoft Windows 2000 Third Edition, Microsoft Press, 2000, pp. 46-87, 177-206, and 215-236.

Ford et al., "The Flux OSKit a Substrate For Kernel and Language Research," Proceedings of the sixteenth ACM Symposium on Operating Systems Principles, 1997, pp 38-51.

LIEDTKE "Toward Real Microkernels," Communications of the ACM, vol. 39, No. 9, Sep. 1996, pp. 70-77.

LIEDTKE, "On Micro-Kernel Construction," Proceedings of the fifteenth ACM symposium on Operating systems principles, 1995, pp. 237-250.

Chapter 4—Installing Windows 2000 Professional, Microsoft Windows 2000 Professional Resource Kit, 30 pages, U.S.A.

Chapter 5—Customizing and Automating Installations, Microsoft Windows 2000 Professional Resource Kit, 61 pages, U.S.A.

Hillenburg, J.P., "Pentium vs. PowerPC Info," news group posting on comp.sys.amiga.advocacy dated Nov. 1993, 3 pages, USA.

Zhang et al., "A Modeling Perspective of Image-Based Installation," Dell White Paper, pp. 1-13, Mar., 2002, U.S.A.

White Paper, "Microsoft Windows 2000 Server—Remote Operating System Installation," Microsoft Corporation, pp. i-iv, 1-41, 1999, U.S.A.

* cited by examiner

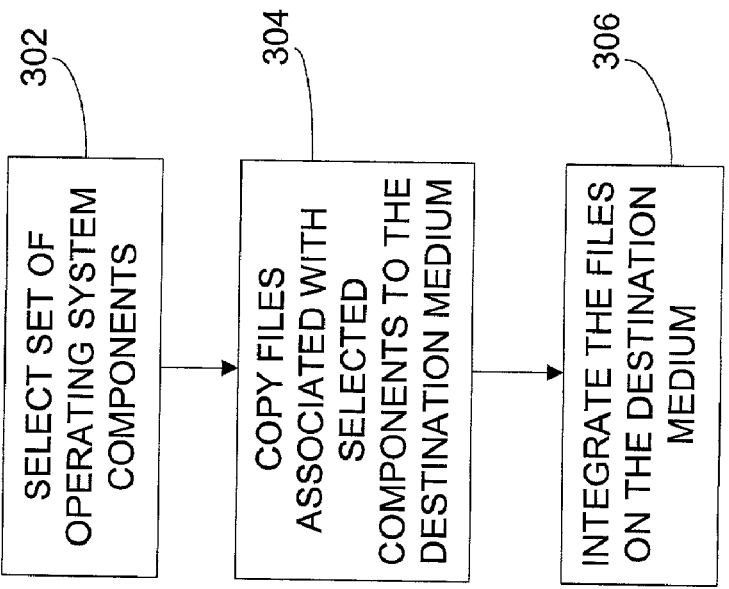

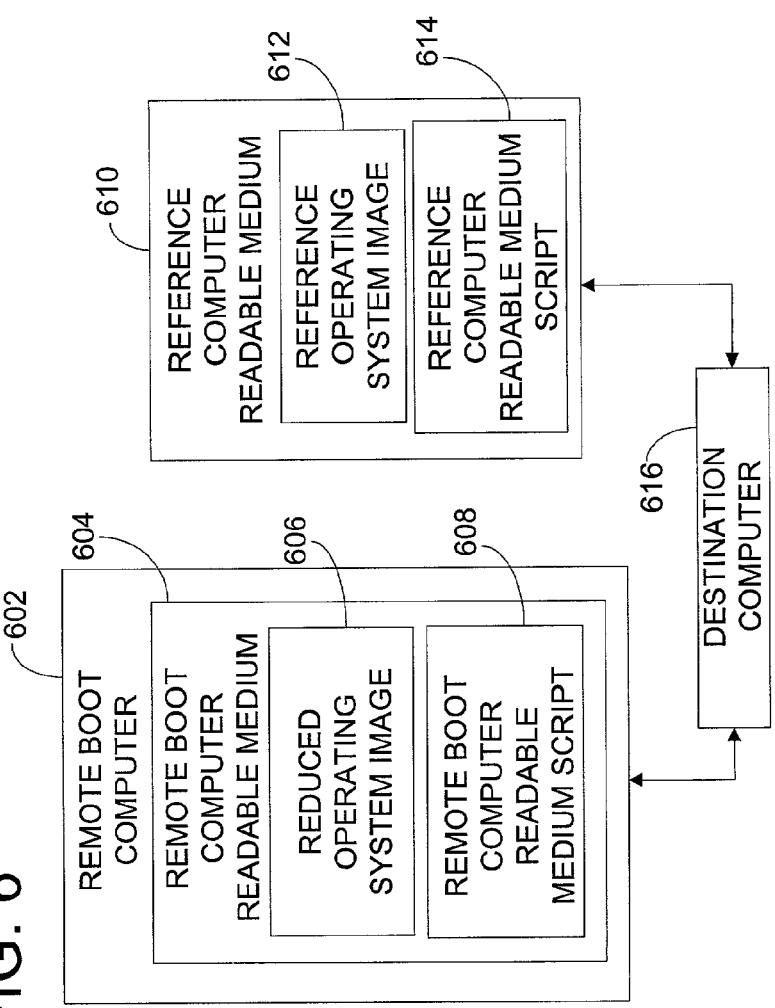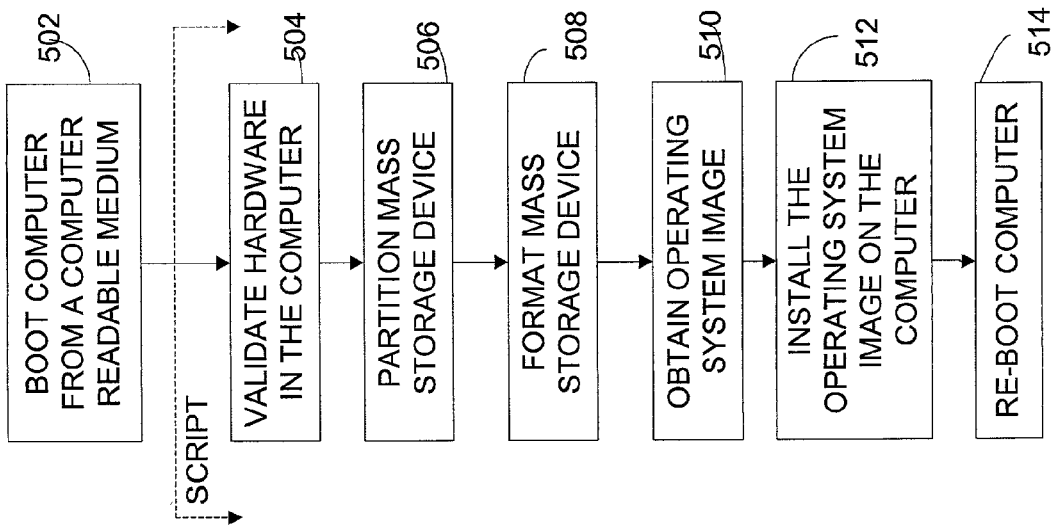

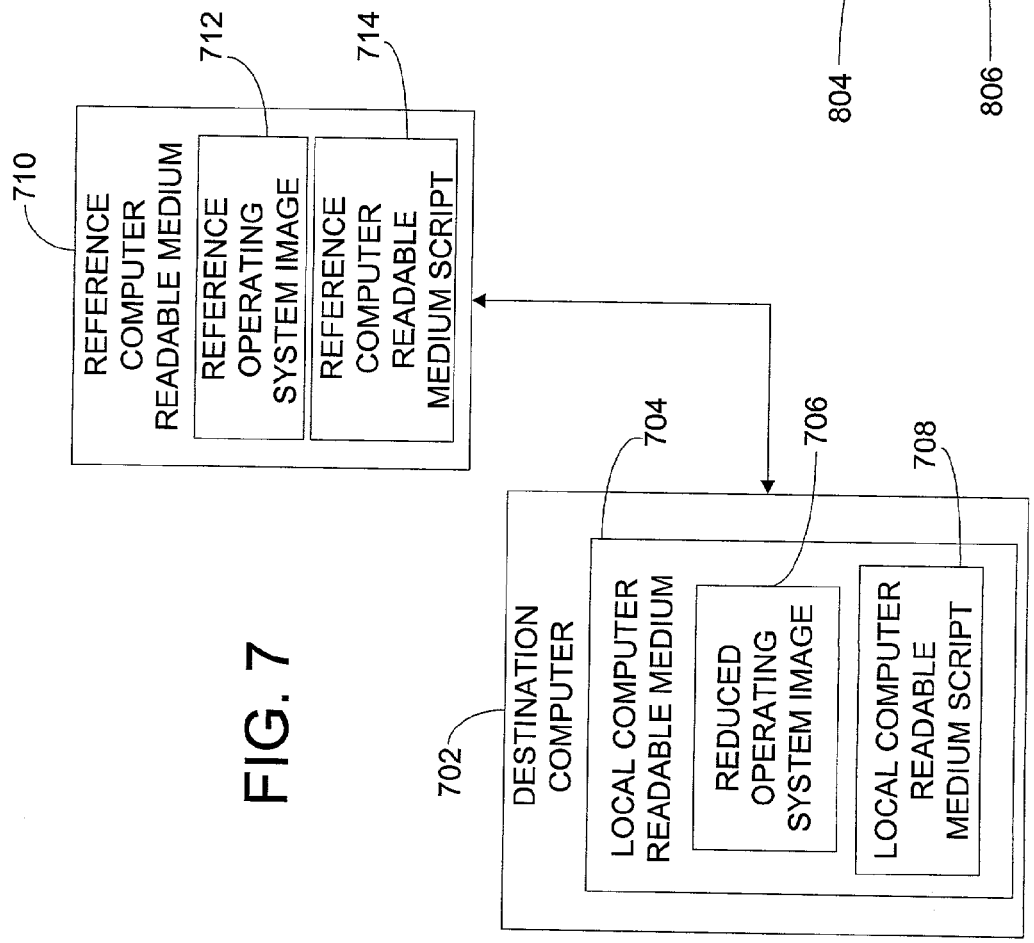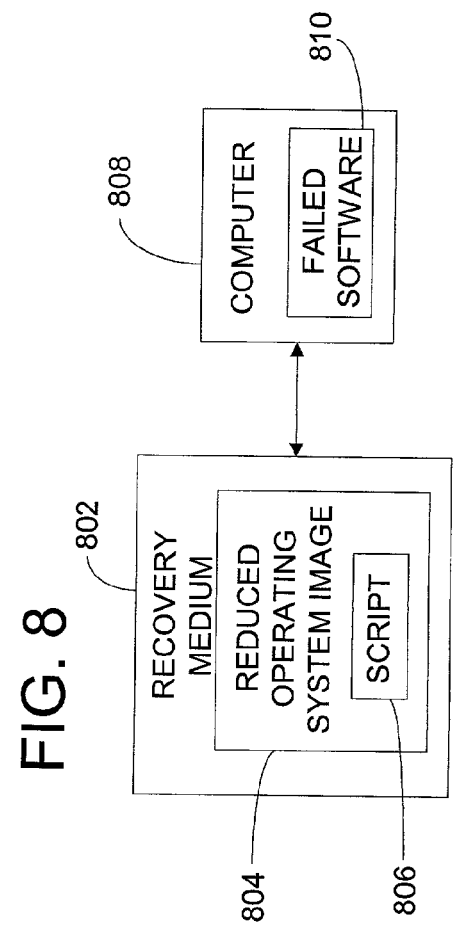

METHOD AND SYSTEM FOR CREATING AND EMPLOYING AN OPERATING SYSTEM HAVING SELECTED FUNCTIONALITY

TECHNICAL FIELD

The present invention relates to the field of computer operating systems. In particular, this invention relates to an operating system with scripting support having components selected by a user to perform functionality desired by the user.

BACKGROUND OF THE INVENTION

An operating system (OS) image interacts with hardware in a computer to perform a multitude of functions. A typical OS image requires a significant amount of space on a mass storage device such as a hard disk drive. The significant disk space requirement renders the typical OS image inefficient for situations where only limited functionality is required of the OS image. In addition, the significant disk space requirement and the need for read-write access to the mass storage device prevent the typical OS image from residing on a single read-only, computer readable medium.

To install an OS image on the computer, another OS image with minimal functionality such as MS-DOS that can boot the computer from read-only media has historically been used. However, MS-DOS has several limitations including a 640-kilobyte volatile memory limit and incompatibility with 64-bit computers. Further, during booting and installation of the OS image using MS-DOS, multiple re-boots of the computer are often necessary. In addition, software routines for operating the hardware (known as hardware drivers that are provided by manufacturers of the hardware) must be modified to work within the constraints of MS-DOS to validate the hardware using MS-DOS.

Similarly, some versions of the WINDOWS NT operating system (NT), for example, are installed through a textmode setup that prepares the computer for an initial boot into NT. A graphical user interface mode setup configures the installation based on input from the user. Referred to as on-line installation, this method of installation includes bootstrapping NT itself on the computer. However, on-line installation requires an undesirable number of re-boots of the computer.

Most OS images include a kernel containing software routines for performing the basic, required functions of the OS. Additional functionality is implemented by software outside the kernel. Some OS images include a microkernel that has minimal functionality and size. In such microkernel OS images, the software outside the kernel performs a significant amount of the functionality required of the OS image. However, these microkernel OS images are generally hardware dependent and do not include a text-based script customizable by the user to perform specific functions desired by the user.

The invention described below addresses these and other disadvantages.

SUMMARY OF THE INVENTION

The invention creates a reduced operating system (OS) image from an installation OS image. The invention also includes the resulting reduced OS image. A user, such as an original equipment manufacturer (OEM) of personal computers (PCs), selects a set of OS components from a plurality of OS components available in the installation OS image. The selected set of OS components is installed as the reduced OS image on a computer readable medium (CRM) such as a CD-ROM. The reduced OS image includes a script for interacting with the reduced OS image to perform functions desired by a user, such as displaying a command prompt, installing a reference OS image, or recovering from a failed installation of the reference OS image. The reduced OS image has small volatile and non-volatile memory storage requirements. The invention may be used to install the reference OS image on computers with architectures greater than 32-bits. The invention is also operative on computers with architectures of 32-bits or less. The reduced OS image uses hardware drivers which are used to control the hardware (generally written for protected mode) to verify proper operation of the hardware. The reduced OS image of the invention is hardware independent since the reduced OS image includes a plurality of user-specified hardware drivers. The invention provides a framework for allowing the user to install the reference OS image on the computer with a single re-boot of the computer. The script performs any number of functions including, but not limited to, enabling network connectivity, partitioning a mass storage device, and formatting the mass storage device with a file system. For example, the script performs the function of formatting the mass storage device with a file system according to a format available in the WINDOWS operating system.

In accordance with one aspect of the invention, a computerized method provides a user-customized text-based script, boots a computer from an operating system image on a computer readable medium, and performs one or more functions on the computer according to the script. The computer has a 32-bit or 64-bit architecture.

In accordance with another aspect of the invention, a system includes means for providing the user-customized, text-based script, means for booting a computer having a 32-bit or 64-bit architecture from an operating system image on a computer readable medium, and means for performing one or more functions on the computer according to the user-customized, text-based script.

In accordance with another aspect of the invention, a computerized method provides a user-customized, text-based script, boots a computer from a first operating system image on a computer readable medium, and installs a second operating system image on the computer according to the user-customized, text-based script. The booting and installing occur with a single re-boot of the computer.

In accordance with another aspect of the invention, a system includes a first operating system image with operating system components selected by a user, a second operating system image, and a text-based script file customizable by a user. The script file interacts with the first operating system image to install the second operating system image on a computer. The computer has a 32-bit or 64-bit architecture.

In accordance with another aspect of the invention, a computer readable recovery medium for use with a computer has an operating system image and a text-based script file. The script file interacts with the operating system image to direct recovery from failure of software on the computer.

In accordance with another aspect of the invention, a computerized method creates an operating system image on a destination medium. The method selects a subset of operating system components from a plurality of operating system components, generates a list of files associated with the selected subset of operating system components, and installs the selected subset of operating system components on the destination medium as the operating system image. The installing includes copying the files from an installation medium to the destination medium.

In accordance with another aspect of the invention, a system of creating an operating system image on a destination medium includes means for selecting a subset of operating system components from a plurality of operating system components, means for generating a list of files associated with the selected subset of operating system components; and means for installing the selected subset of operating system components on the destination medium as the operating system image. The means for installing includes copying the files from an installation medium to the destination medium.

In accordance with another aspect of the invention, a system creates an operating system image on a destination medium from a plurality of operating system components. The system includes at least one application program and operating system component modifications. The application program, when executed by one or more processors on a computer, causes the one or more processors to perform acts including allowing a user to select a set of operating system components from the plurality of operating system components. The operating system component modifications allow the selected set of operating system components to execute as the operating system image.

BRIEF DESCRIPTION OF THE DRAWINGS

FIG. 2 is a block diagram of one embodiment of the method and system of the invention illustrating an operating system component.

FIG. 3 is a flow chart of one embodiment of the method and system of the invention illustrating installation of the reduced operating system image on a destination medium FIG. 5 is a flow chart of one embodiment of the method and system of the invention illustrating use of the reduced operating system image to install another operating system image FIG. 6 is a block diagram of one embodiment of the method and system of the invention illustrating booting a destination computer from a remote boot computer to install a reference operating system image on the destination computer.

FIG. 7 is a block diagram of one embodiment of the method and system of the invention illustrating booting a destination computer from a local computer readable medium to install a reference operating system image on the destination computer.

FIG. 8 is a block diagram of one embodiment of the method and system of the invention illustrating interaction between a computer with failed software and a recovery medium.

Corresponding reference characters indicate corresponding parts throughout the drawings.

DETAILED DESCRIPTION OF THE INVENTION

Figure 1:
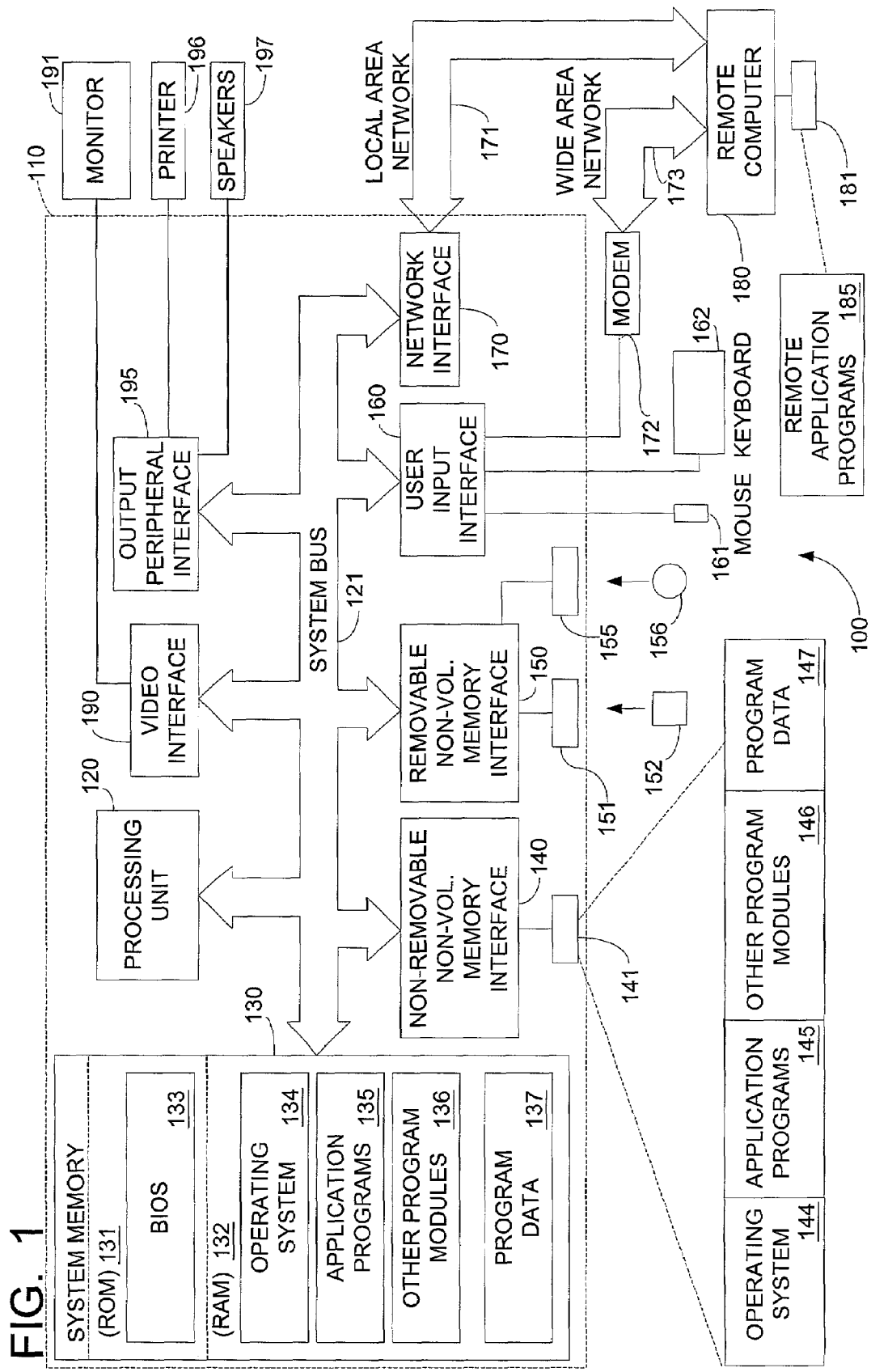
FIG. 1 is a block diagram of one embodiment of the method and system of the invention illustrating one example of a suitable computing system environment on which the invention may be implemented.

In general, the invention relates to a method and system providing at least one application program and necessary modifications to operating system (OS) components to create a bootable, reduced OS image from an installation OS image where the reduced OS image has scripting support to perform one or more functions specified by a user such as an original equipment manufacturer (OEM). The reduced OS image is reduced with regard to functionality and/or size of a fully installed, installation OS image. The reduced OS image has functionality selected by the user.

The user selects the OS components for inclusion in the reduced OS image and optionally includes additional OS components to enable the desired functionality. The application program applies the selections and additions against the installation OS image to create the bootable, reduced OS image. The reduced OS image is written to a computer readable medium (CRM) such as a CD-ROM, stored on a remote server, or installed onto a local mass storage device. The reduced OS image includes a script for performing the functions specified by the user. For example, the user may edit the script to interact with the reduced OS image to install software, to recover from a failed OS installation, to update hardware drivers, to reseal and audit the computer, to execute application programs including other scripts, or to perform any other task.

While an exemplary OS of the invention is the WINDOWS operating system, the invention is also applicable to other operating systems to create and employ the reduced OS image. In the exemplary WINDOWS operating system embodiment, the reduced OS image includes a code base associated with the WINDOWS NT operating system with a minimal WIN32 application programming interface (API) subsystem. The reduced OS image has the minimum number of OS components required to boot into the WIN32 subsystem. The minimum number of OS components includes a kernel, hardware drivers, and system files. The reduced OS image also stores minimal state information about itself in a database such as a hive associated with a registry in the WINDOWS operating system.

For general information regarding the boot process and the OS components available in the WINDOWS operating system, refer to Solomon and Russinovich, *Inside Microsoft Windows* 2000, $3^{rd}$ Edition, 2000, pages 46–87, 177–206, and 215–236, herein incorporated by reference.

In one embodiment, the reduced OS image includes support for a protected operating mode of the microprocessor. The protected mode of microprocessor operation contrasts with a real mode of microprocessor operation. The user edits the script to validate hardware using hardware drivers supplied by a manufacturer of the hardware and intended for use in controlling the hardware. For the supplied hardware drivers that are written for protected mode, there is no need for the user to write a separate hardware driver or otherwise modify the protected mode hardware drivers to operate in real mode. The user uses the unmodified hardware drivers in the reduced OS image to validate the hardware in the protected mode of the reduced OS image. When the reduced OS image is used to install another OS, the results of the hardware validation are also applicable to the installed OS.

By editing the script, the user configures automated, hands-free installations of the reference OS image. The reduced OS image can be used to install any OS image. In addition, the reduced OS image can be used to fix an OS installation or to execute an end-to-end graphical user interface (GUI) application.

In one embodiment, the OEM uses the reduced OS image to install a reference OS image onto personal computers (PCs) that have either a 64-bit architecture or a 32-bit architecture. The OEM receives a software development kit (SDK) containing the application program and necessary OS component modifications to create the reduced OS image. The OEM selects the OS components necessary to perform installation of the reference OS image onto destination computers at an OEM factory in view of the specific PC hardware and other site considerations of the OEM. In particular, the OEM adds or removes the OS components such as hardware drivers and specifies the mass storage device configuration via a text file. The application program creates the reduced OS image with the selected set of OS components. The OEM then uses the reduced OS image to boot a destination computer such as a PC with an unformatted hard disk drive, validate the hardware, format the hard drive of the destination computer, and install the reference OS image onto the destination computer.

The destination computer is designed according to various architectures including, but not limited to, 32-bit and 64-bit. Each computer is generally classified by its architecture. A 64-bit architecture generally refers to the capability of a computer to internally manipulate data in groups of 64 bits. A 64-bit computer architecture is based around elements which are 64-bits wide including a processing unit (see FIG. 1, reference character 120), at least one memory register internal or external to the processing unit, and a data bus. Similarly, when referring generally to a class of computers with architecture greater than 32-bits, the computer may be a 64-bit architecture, a 128-bit architecture, or any architecture that manipulates data internally in groups of at least 32 bits. Those skilled in the art will note that the systems and methods of the present invention are not limited to the computer architectures currently available. It is contemplated that the invention is applicable to future computer architectures, including, but not limited to, 128-bit and 256-bit architectures. This invention is also applicable to entirely different types of computers, even non-digital computers, if the computer has a concept of a software-based OS controlling the computer and its peripherals. In addition, it is contemplated that the invention is applicable to computer architectures of 32-bits or less including, but not limited to, a 32-bit architecture, a 16-bit architecture, an 8-bit architecture, or a single-bit architecture. Generally, the systems and methods of the invention are architecture independent in that the invention is operative with any computer architecture that is supported by the reduced OS image. For example, if the reduced OS image provides support for computers with a 32-bit architecture and computers with a 64-bit architecture, the invention applies to computers with either a 32-bit or 64-bit architecture. In one embodiment, the steps of booting and performing are operative on a computer having an architecture of 32-bits or less. In addition, the script file is operative on a computer having an architecture of 32-bits or less.

An OS such as the MICROSOFT disk operating system (MS-DOS) has historically supported scripting functionality on computers having 16-bit architectures. MS-DOS utilizes interrupts to communicate with a basic input output system (BIOS) to perform functions on a computer. The BIOS executes MS-DOS commands in the context of the specific computer on which MS-DOS and the BIOS operate. The BIOS can be modified to execute the 16-bit MS-DOS commands on a 32-bit computer. However, the BIOS cannot be modified to execute the 16-bit MS-DOS commands on a computer with an architecture greater than 32-bits without a complete re-write of the BIOS to provide support for such an architecture. Further, MS-DOS cannot be modified to generate commands operable on a computer with an architecture greater than 32-bits without a complete re-write of MS-DOS to provide support for such an architecture. MS-DOS is fundamentally limited to architectures of 32-bits or less because of the inherent design of MS-DOS and the BIOS. A complete rewrite of MS-DOS and/or the BIOS would result in a new OS, such as the OS described herein.

For example, among other limitations, generally MS-DOS cannot access large amounts of memory since MS-DOS was primarily designed for 8-bit and early 16-bit architecture processors which generally had an address limitation of accessing only one megabyte of memory since the address bus was only twenty bits wide. Without a complete rewrite of MS-DOS (which would include special MS-DOS extensions), the applications running under MS-DOS would not be able to access memory above the one megabyte limit on processors which have an address bus wider than 20 bits. MS-DOS is unable to be modified to support such memory accesses without a complete re-write. Generally, most of the applications running under MS-DOS have a maximum of only 640 kilobytes of memory.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. In one embodiment of the invention, the processing unit 120 has a 32-bit or 64-bit architecture. The system bus 121 may be any of several types of bus structures including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes at least some form of CRM. CRM can be any available medium that can be accessed by computer 110 and includes both volatile and nonvolatile media, removable and non-removable media. By way of example, and not limitation, CRM may comprise computer storage media and communication media. Computer storage media include volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and includes any information delivery media. Those skilled in the art are familiar with the modulated data signal, which has one or mare of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of CRM.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives or other mass storage devices and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. The OS according to the invention, such as operating system 144, is a fundamental software control program for computer 110, performing various functions including providing a user interface, managing the execution of application programs 145, and controlling the input of data from and output to various input/output (I/O) devices. Application programs 145 represent one or more of a wide variety of software routines that can be executed on computer 110. Examples of application programs include, but are not limited to, educational programs, reference programs, productivity programs (e.g., word processors, spreadsheets, databases), recreational programs, and utility programs (e.g., communications programs). Application programs 145 may be installed on computer 110 by the user, or alternatively pre-installed by the OEM and/or distributor of computer 110.

A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and global computer network (e.g., the Internet).

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Referring next to FIG. 2, a block diagram illustrates an OS component 202. In some computer systems, the OS image is organized into OS components 202 where each OS component 202 performs one or a combination of the functions. Each OS component 202 includes up to N files 204 accessible by the computer.

Referring next to FIG. 3, a flow chart illustrates installation of the reduced OS image on a destination medium. The destination medium is any CRM, accessible locally or remotely by a computer. The user selects at 302 at least one OS component from the plurality of OS components (see FIG. 2, reference character 202). In one embodiment, the user selects a set of OS components. The plurality of OS components include drivers to enable hardware in the computer including mass storage devices, network cards, and/or any device illustrated or contemplated by FIG. 1. As described above, each of the plurality of OS components comprises at least one file (see FIG. 2, reference character 204). Installation of the reduced OS image includes copying and integrating files associated with the selected set of OS components and the related OS component modifications on the destination medium. The files associated with the selected OS components are copied at 304 to the destination medium and integrated at 306 as the reduced OS image.

In one embodiment, the selected set of OS components in the reduced OS image includes a subset of the plurality of operating system components in the installation OS image. The user optionally includes additional OS components to the selected set of OS components. The additional OS components include any component supplied by the user not present in the plurality of OS components. The additional OS components include, but are not limited to, specific hardware drivers, script files, and application programs. For example, the specific hardware drivers include mass storage device drivers, video device drivers, input device drivers, and network device drivers. The hardware drivers to be included in the reduced OS image are customizable by the user to include any and all of the hardware drivers available in the installation OS image or from third parties. Similarly, the user optionally includes tools or utilities such as network clients, test harnesses, and reporting utilities. The files associated with the additional OS components are provided by the user and copied to the destination medium for integration into the reduced OS image. For example, to add support for a specific mass storage device, the user adds an entry for the specific mass storage device to a list of hardware drivers and includes the hardware driver associated with the specific mass storage device in a file directory containing all the drivers. The user adds or deletes support for specific hardware devices before or after installing the reduced OS image on the destination medium.

In one embodiment, the reduced OS image requires about 100 megabytes of non-volatile memory storage compared to a typical 950 megabytes to 1.2 gigabytes of non-volatile memory storage for a fully installed OS image. Those skilled in the art will note that as operating systems evolve, the non-volatile memory storage requirements of the reduced OS image may be significantly less than 100 megabytes without affecting the functionality of the invention.

The reduced OS image includes a minimal file list and minimal state information. For example, in the WINDOWS operating system, state information is stored in a database known as a registry which includes a set of discrete files called hives. There is a master file layout list which contains each and every file name that is associated with an OS component in a medium containing the installation OS image. Entries in the master file layout list indicate whether or not they are needed for the reduced OS image. For example, in the WINDOWS operating system, the master file layout list is the file layout.inf. The invention includes image generation software to parse the master file layout list and identify the files necessary for the reduced OS image. The image generation software installs the reduced OS image on the destination medium by copying the identified files to a file directory on the destination medium. The file directory can then be imaged onto a non-volatile medium. Additionally, the image generation software uncompresses the identified files on the destination medium as necessary. The image generation software also allows the user to add additional required files to the reduced OS image while creating the directory structure. In this manner, the user adds newer driver files and other utility files which are not present as part of the installation OS image.

A GUI and a textual interface constitute means for selecting a subset of OS components from a plurality of OS components. The user interacts with either interface via an application program, such as the SDK, to select the subset of OS components for inclusion in the reduced OS image. The SDK as described in FIG. 3 above constitutes means for generating a list of files associated with the selected subset of OS components and means for installing the selected subset of OS components on the destination medium as the reduced OS image. Copying the files from an installation medium to the destination medium constitutes means for installing. Further, the examples described above and examples described elsewhere herein constitute means for selecting a subset of OS components, means for generating the list of files, and means for installing the selected subset of OS components.

Figure 4:
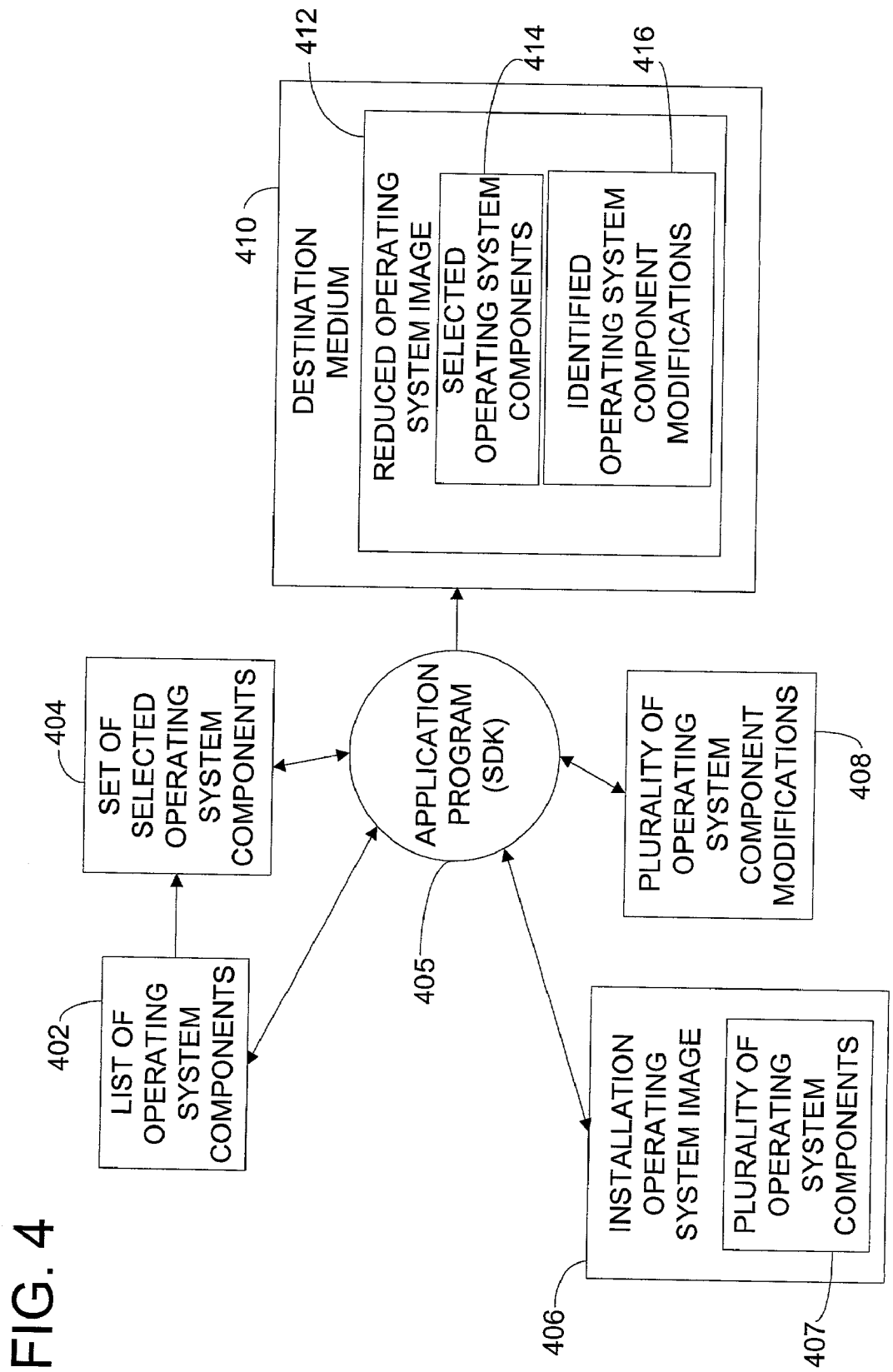
FIG. 4 is a block diagram of one embodiment of the method and system of the invention illustrating installation of the reduced operating system image on a destination medium

Referring next to FIG. 4, a block diagram illustrates installation of a reduced OS image 412 on a destination medium 410. A software development toolkit (SDK) 405 or at least one other application program displays a list of OS components 402 to the user, such as a list of hardware drivers. The user selects a set of OS components 404 from the list 402. One or more processors on a computer execute the SDK 405 to allow the user to select the set of OS components 404 from the list of OS components 402. An installation OS image 406, accessible by the SDK 405, provides a plurality of OS components 407 corresponding to the list 402. For example, the installation OS image 406 is located on a medium including the WINDOWS operating system product distribution. The SDK 405 applies the selected set of OS components 404 against the installation OS image 406 to identify the files associated with the selected set of OS components 404. The SDK 405 also accesses and identifies any of a plurality of OS component modifications 408 and corresponding files that relate to the selected set of OS components 404. Identified OS component modifications 416 allow selected OS components 414 to execute as the reduced OS image 412 on the destination medium 410. The OS component modifications 408 replace, supplement, or otherwise modify the plurality of OS components 407.

In particular, the modifications 408 to the plurality of OS components 407 may include modifying the OS components 407 to not write data to non-volatile memory. For example, in the WINDOWS operating system environment, the OS components of the invention write registry information to volatile memory instead of non-volatile memory. The registry information includes OS configuration data stored in a database in discrete files known as hives. During bootup, a setup loader passes a flag to a kernel associated with the reduced OS image to indicate to the kernel that the reduced OS image 412 is being booted. During kernel initialization, the registry manager looks at the flag and writes the registry to volatile memory even when booting from a read only CRM. Changes made to entries in the registry are made in volatile memory. All changes are discarded if the reduced OS image 412 re-boots, as is the nature of volatile memory. Storing the registry information in volatile memory provides the reduced OS image 412 with a clean registry at each boot. In an alternative embodiment, if the destination computer has write access to non-volatile memory, the user is offered the option to save registry information or other configuration information to the non-volatile memory to allow the user to maintain that information across re-boots.

Entries in the hives may also be modified. The hive entries are stored in a text file. Hive creation software creates binary versions of the text files while creating the reduced OS image 412. The hive creation software parses the hive entries in the text files and creates a binary hive for the destination medium. The hive creation software also modifies existing binary hives by loading the hives into memory, applying the requested changes, and saving the modified hives in binary format.

For example, there are four hives that are needed by the WINDOWS operating system to boot. The necessary hives include SYSTEM, SOFTWARE, SECURITY, and Security Accounts Manager (SAM) hives. A default SYSTEM hive includes information about what subsystems, hardware drivers, and services to run while bootstrapping the WINDOWS operating system. The SYSTEM hive of the invention is a modified version of the SYSTEM hive of the current WINDOWS operating system setup. The hive creation software applies modifications in a text file such as minint.inf to the default SYSTEM hive. The SOFTWARE hive is created by the hive creation software from a text file such as hivesft.inf. The SECURITY and SAM hives are zero length files to indicate that there is no relevant security information on the reduced OS image 412.

Based on the loader flag passed to the kernel which indicates that the reduced OS image 412 is booting, the registry manager creates a registry key under a particular location. For example, the registry manager creates a DWORD value called "Option" after creating the volatile key HKLM\System\CurrentControlSet\Control\Mini\NT. The "Option" will be set to 1 to indicate that the user is in the reduced OS image 412 environment. Application programs executing in user mode query the registry key as needed to perform configuration according to the value.

In the exemplary WINDOWS operating system embodiment of the invention, the reduced OS image has security privileges of the "system" account. The memory available to the reduced OS image is limited to the amount of volatile memory available because a paging file is not present to provide access to additional memory. In addition, some other unwanted services (e.g., system file protection) which are started by default in the exemplary WINDOWS operating system embodiment of the invention are disabled for the reduced OS image.

The SDK 405 installs the selected OS components 414 and the identified OS component modifications 416 onto the destination medium 410 as the reduced OS image 412 by copying and integrating the files associated with the selected set of OS components 404 and identified OS component modifications 416. The user optionally includes additional OS components not present in the plurality of OS components 407. The additional OS components are added to the selected OS components 414 via the SDK 405. The SDK 405 includes a script file on the destination medium 410 to perform functions specified by the user. If the destination medium 410 is a read-only CRM, the user customizes the script file before the reduced OS image 412 is installed on the CRM. If the destination medium 410 is a read-write CRM, the user customizes the script either before or after the reduced OS image 412 is installed on the CRM.

Those skilled in the art will note that the installation OS image 406, the plurality of OS component modifications 408, and the destination medium 410 of FIG. 4 may be accessible locally or remotely by the SDK 405 or may be included in the SDK 405. Examples of remote access are described by the networking environments of FIG. 1.

Referring next to FIG. 5, a flow chart illustrates use of the reduced OS image to install another OS image. A computer boots at 502 from the reduced OS image on the CRM. In one embodiment, the reduced OS image supports a textual user interface and a graphical user interface (GUI). In particular, the GUI supports a video graphics array (VGA) video mode with at least 256 colors and a resolution of at least 640×480 pixels. A user-customized, text-based script interacts with the reduced OS image to direct performance of one or more functions on the computer. The script identifies steps in which the functions are performed. The script also identifies the sequence in which the steps are executed. The script supports multitasking as well as sequential execution of the steps. That is, the user specifies on a step-by-step basis whether or not each step in the script should be executed only after the preceding step has completed execution. In this manner, the script allows the execution of one step at a time and the execution of multiple steps concurrently. In one embodiment, the script is a file readable by the computer and located on the CRM. Computer-executable instructions reside on a single CRM to coordinate the booting and performance of the functions according to the script. In alternative embodiments, the script is located local to or remote from the computer. The CRM is either remote from or local to the computer (see FIGS. 6 and 7, respectively). For example, the computer accesses the CRM or script remotely as described in the networking environments of FIG. 1.

In one embodiment, the user, such as the OEM, edits the script so that the script performs functions necessary to install a reference OS image on the computer. In one embodiment, the computer is a blank or raw PC with an unformatted mass storage device without partitions. In another embodiment, the computer is a PC with a CRM that has an OS which needs to be updated. The user also edits the script to validate at 504 hardware on the computer. The hardware on the computer includes a network card, a mass storage device, a video card, and/or any other device illustrated or contemplated in FIG. 1. The script validates the hardware by enabling the specified hardware device and optionally running tests to verify proper operation and identify faulty hardware. Validating each hardware device generally requires a hardware driver to allow the reduced OS image to communicate with the hardware device. A hardware driver is specialized software supplied by a manufacturer of the hardware device that, operative with an OS installed in the computer, communicates with the hardware device. In one embodiment, the reduced OS image supports a plug-and-play (PNP) protocol to detect hardware in the computer and identify the appropriate hardware driver. With the reduced OS image, a PNP manager service is also running. During kernel initialization, a kernel mode portion of the PNP manager detects various hardware devices on the computer and writes information on the detected hardware devices into a particular location in the registry. In the reduced OS image of the invention, a user mode PNP manager is essentially disabled to not install hardware drivers for the detected hardware devices on its own. This contrasts with other OS images where the user mode portion of the PNP manager determines whether or not hardware drivers for the detected hardware devices are installed. If the hardware drivers are not installed, the user mode portion of the PNP manager installs the hardware drivers for these hardware devices.

In the invention, if the appropriate hardware driver loads and initializes properly, the reduced OS image assumes that the specific hardware is functioning properly. Additional testing is optionally performed on the hardware by a test suite supplied by a manufacturer of the hardware. For example, the user can send an input/output control (IOCTL) command to the hardware driver to communicate with the hardware. By analyzing a value returned by the IOCTL command, the user verifies that the hardware is operating as expected. As another example, to verify if the ACME network interface card (NIC) is working properly, the user loads the hardware driver ACMENIC.SYS. Once ACMENIC.SYS loads successfully, the user optionally performs loopback testing using ACMENIC.SYS to verify that the NIC is configured and working properly.

The hardware drivers provided to OEMs or available within the reduced OS image are used to control the hardware and are written for use by an OS that supports protected mode. In one embodiment, the reduced OS image of the invention is an OS that supports protected mode, such as the WINDOWS operating system environment. The reduced OS image includes some or all the hardware drivers available for some or all the possible hardware that may be present on the computer. In this manner, the reduced OS image is hardware independent. In one embodiment, at least one text file such as txtsetup.sif or txtsetup.oem lists all the hardware drivers available for all the possible hardware that may be present in the computer. The user edits the text file to represent the possible spectrum of hardware that may be present in the computer by adding or deleting hardware devices from the list. By minimizing the list of hardware drivers, the time required for hardware detection and validation is minimized.

In the exemplary WINDOWS operating system embodiment, the hardware drivers are either boot hardware drivers or non-boot hardware drivers. The reduced OS image automatically loads the boot hardware drivers. The boot hardware drivers are hardware drivers that include, but are not limited to, input, storage (hard disk drive and file system), and display drivers. Since the reduced OS image boots on various computers, different computers might have different display, input, and storage devices. The reduced OS image includes a common, dynamic superset list of drivers which would work on most of the computers. The setup loader, the loader which gets used during regular setup, loads drivers including, but not limited to, a default VGA driver, generic mass storage drivers for various frequently used hard disk drives, regular file system drivers and input drivers for keyboard and mouse. Since a VGA compatible display device is needed for most WINDOWS operating systems, the default VGA driver works for nearly all the computers in the WINDOWS operating system environment. The setup loader loads these drivers as boot drivers, creates a list and passes the list to the kernel to initialize the drivers. Before the driver is initialized, a valid entry under the services key in the SYSTEM hive is created. Since these drivers are loaded dynamically, the required registry entries cannot be created during generation of the reduced OS image. Another driver of the invention such as setupdd.sys is executed during boot driver initialization to create the required entries in the registry before the other drivers are initialized. This aids in proper initialization of the drivers. The user loads the non-boot hardware drivers as specified in the script.

The script directs partitioning at 506 of the mass storage device. Partitioning the mass storage device includes creating, deleting, or formatting at 508 specific areas on the mass storage device. In one embodiment, the reduced OS image refers to a text file such as partinfo.txt to obtain specific partitioning information. The user edits the partinfo.txt to include specific partitioning information desired by the user. The script formats the mass storage device with a file system in a format supported by the reduced OS image. For example, in the WINDOWS operating system, the supported file system formats include CDFS, UDF, FAT12, FAT16, FAT32, and NTFS.

If the CRM with the reference OS image is located remotely from the computer, the script enables network connectivity. The script executes a utility such as factory.exe to detect the specific network interface in the computer and install the appropriate hardware driver for that specific network interface. The factory.exe utility uses the PNP manager API. After the network drivers are installed, the script initializes a transmission control protocol/internet protocol (TCP/IP) stack and related services via a utility such as netcfg.exe. The TCP/IP stack and related services provide the computer with access to remote computers, e.g., through a "net use" command. If the user does not want network connectivity, the user modifies the script to disable the execution of factory.exe and netcfg.exe. After enabling network connectivity, the script obtains at 510 and installs at 512 a reference OS image on the computer from the remote CRM. In one embodiment, the reduced OS image supports network connectivity protocols such as server message block (SMB) to enable file access between computers.

Installing the reference OS image onto the computer includes copying one or more files associated with the reference OS image to the computer and integrating the files. In the exemplary WINDOWS operating system environment, integrating the files includes, but is not limited to, creating or updating a registry and creating or updating desktop icons. The script identifies the steps in which the files are copied and integrated. The script also identifies the sequence in which the steps are executed. After installation of the reference OS image on the computer, the computer is either shutdown for delivery to the customer or re-booted at 514. Re-booting includes shutting down the computer, and then loading and initializing the installed reference OS image. In one embodiment, the invention provides a framework for booting and installation of the reference OS image on the computer with only a single re-boot. That is, the script allows the user to image the reference OS image onto the computer with a single re-boot. The invention allows the user to image the reference OS image onto a CRM associated with the computer. The user implements the desired imaging method via the script. The imaging method can be any method of transferring files including, but not limited to, file copying and complete OS installations. After the re-boot, the installed reference OS image coordinates any post-installation personalization of the OS image to the end user.

Volatile and non-volatile CRM accessible locally or remotely constitute means for providing a user-customized, text-based script. Booting from a local CRM, or remotely booting via PXE or any other remote boot protocol constitutes means for booting a computer having a 32-bit or 64-bit architecture from the CRM. Application programs such as cmd.exe and csh.exe in the exemplary WINDOWS operating system environment constitute means for performing one or more functions on the computer according to the user-customized, text-based script. Further, the examples described above and examples described elsewhere herein constitute means for providing the script and means for booting a computer.

Referring next to FIG. 6, a block diagram illustrates booting a destination computer 616 from a remote boot computer 602 to install a reference OS image 612 on the destination computer 616. In the WINDOWS operating system embodiment, for example, the remote boot computer 602 is a remote installation server. The remote boot computer 602 includes a remote boot CRM 604 that includes a reduced OS image 606 and a remote boot CRM script 608. In one embodiment, the destination computer 616 is connected to the remote boot computer 602 as described in the exemplary networking environments in FIG. 1. The destination computer 616 boots from the remote boot CRM 604 via a number of methods and protocols including, but not limited to, a pre-boot execution environment (PXE). A PXE boot conforms to a dynamic host configuration protocol (DHCP). The destination computer 616 broadcasts or otherwise communicates a DHCP boot request across the network. The remote boot computer 602 receives the DHCP boot request and initiates booting the destination computer 616 from the remote boot CRM 604. Booting the destination computer 616 includes loading the reduced OS image 606 from the remote boot computer 602 to volatile memory on the destination computer 616 and initializing the reduced OS image 606 on the destination computer 616.

One example of a boot process that is applicable to both local and remote booting occurs in the WINDOWS operating system. In the WINDOWS operating system embodiment according to the invention, the reduced OS image 606 includes a code base associated with the WINDOWS NT operating system with a minimal WIN32 application programming interface (API) subsystem. The minimal WIN32 API subsystem includes, but is not limited to, input/output APIs and core WIN32 APIs. The reduced OS image 606 uses the setup loader instead of a boot loader to load the reduced OS image. The user specifies a loader flag in a configuration file for use by the setup loader to identify the OS image on the remote boot CRM 604 as the reduced OS image 606. During bootup, the setup loader sets the flag. Responsive to the set flag, functionality within the reduced OS image is enabled. For example, the flag "/minint" is specified in boot.ini. The "/minint" flag is similar to other loader flags such as "/debug" and "/vga." In this manner, the setup loader communicates the presence of the reduced OS image 606 to the OS components in the reduced OS image. The OS components alter their behavior as described herein to function as the reduced OS image 606. For example, as described above, the functionality includes loading configuration information into volatile memory. In addition, user mode application programs perform configuration responsive to the set flag. In this embodiment, modifications to the OS components in the installation OS image (see FIG. 4, reference character 406) exist within the OS components but are passive until activated by the presence of the specific loader flag.

The setup loader initializes various hardware drivers as specified in a text file such as txtsetup.sif. The setup loader also allows the user to load additional boot hardware drivers and/or update a hardware abstraction layer to facilitate communication between the reduced OS image 606 and the hardware in the destination computer 616.

The setup loader uses a regular session manager instead of a session manager associated with the setup loader. During bootup, a kernel associated with the reduced OS image 606 executes a utility such as smss.exe. When smss.exe executes, it looks for the registry key created during the kernel initialization to indicate that the OS is the reduced OS image 606. If the registry key is present, smss.exe omits other operations normally performed when booting into the WINDOWS operating system environment including, but not limited to, creating a pagefile. The utility smss.exe also executes another utility such as winlogon.exe to look at the registry key. If the registry key is present, winlogon.exe executes another process specified in the registry such as cmd.exe instead of executing an authentication dialog and explorer.exe. A shell such as cmd.exe or csh.exe supports script functionality within the WINDOWS operating system. The selection of cmd.exe or another shell is configurable by the user before or after generation of the reduced OS image 606. The user optionally specifies a custom shell environment to be the default shell for the reduced OS image 606. The shell supports scripting with one or more script files such as a winBOM.ini file or a floppy.cmd file to perform functions specified by the user. In this embodiment, the reduced OS image 606 searches for the script file in the reduced OS image 606 or in other locations such as removable non-volatile memory specified by the user. If the script is located, the reduced OS image 606 executes commands within the script. If the script is not located, the reduced OS image 606 displays a command prompt to accept commands input by the user. For example, with reference to FIG. 6, the user specifies execution of either, both, or neither of the remote boot CRM script 608 or a reference CRM script 614.

The utility winlogon.exe then waits for the cmd.exe or other shell process to complete. For example, winlogon.exe may wait for twenty-four hours. If the shell process has not completed after twenty-four hours, winlogon.exe forces the destination computer 616 to re-boot. The time limit was imposed so that the user cannot misuse the reduced OS image 606 as a fully installed OS image.

The reduced OS image 606 uses the script designated by the user to direct installation of the reference OS image 612 on the destination computer 616. The invention allows the user to configure the installation process for hands-free, automated installation by providing a multi-level scripting environment. The reduced OS image 606 uses a file representing the script, such as winBOM.ini, on any one or a combination of the remote boot CRM 604, a CRM local to the destination computer 616, or a CRM accessible by the destination computer 616 via a network. The scriptable environment allows the user to coordinate execution of any one or a number of scripts located on any number of computers. It is contemplated that the user optionally specifies within a specific script the execution of another script.

For example, a final step of the remote boot CRM script 608 can execute the reference CRM script 614.

After the destination computer 616 boots, the script designated by the user locates a reference CRM 610 that includes a reference OS image 612 and the reference CRM script 614. The reference CRM 610 is local to the destination computer 616 or otherwise connected to the destination computer 616, for example, as described in the networking environments of FIG. 1. The script installs the reference OS image 612 on the destination computer 616 by copying and integrating files associated with the reference OS image 612 to a mass storage device local to the destination computer 616. In alternative embodiments, the scripts first partitions and formats the mass storage device with a file system. After installing the reference OS image 612 on the destination computer 616, the script shuts down or re-boots the destination computer 616.

The following is an example of the winBOM.ini script file used with the reduced OS image 612 to format a mass storage device and install the reference OS image 612 on the destination computer 616.

```
[Version]
signature=$version$
[Factory]
[NetCards]
[WinPE]
Restart=Reboot
Lang=ENG
SKU=pro
Arch=x86
ConfigSet=Awesome 2001
SourceRoot=\\machinename\WhistlerOPK
Username=
Password=
[DiskConfig]
Disk1=Disk1.config
[Disk1.config]
Size1=*
PartitionType1=primary
FileSystem1=ntfs
QuickFormat1=yes
[OemRunOnce]
```

Referring next to FIG. 7, a block diagram illustrates booting a destination computer 702 from a local CRM 704 for installing a reference OS image 712 on the destination computer 702. The local CRM 704 includes a reduced OS image 706 and a local CRM script 708. The destination computer 702 boots from the reduced OS image 706 on the local CRM 704.

After booting, the reduced OS image 706 uses the script designated by the user to direct installation of the reference OS image 712 on the destination computer 702. The reduced OS image 706 locates the script designated by the user to identify a reference CRM 710 that includes a reference OS image 712 and a reference CRM script 714. The reference CRM 710 is local to or remote from the destination computer 702, similar to the examples in FIG. 6. For example, with reference to FIG. 7, the user specifies execution of either, both, or neither of the local CRM script 708 or the reference CRM script 714. The script installs the reference OS image 712 on the destination computer 702 by copying and integrating files associated with the reference OS image 712 to a mass storage device associated with the destination computer 702. In alternative embodiments, the script first partitions and formats the mass storage device with a file system. After installing the reference OS image 712 on the destination computer 702, the script shuts down or re-boots the destination computer 702.

Referring next to FIG. 8, a block diagram illustrates interaction between a computer 808 with failed software 810 and a recovery medium 802 with a reduced OS image 804 that has a script 806. The user customizes the script 806 to perform recovery of the computer 808 from the failed software 810. For example, the script 806 may be the script of FIGS. 5, 6, or 7. The recovery medium 802 includes the reduced OS image 804 and the script 806. The computer 808 has software such as an OS or an application program that has failed. The failed software 810 includes, but is not limited to, software that has become corrupted, has operational flaws, or otherwise malfunctions. The script 806 directs recovery of the failed software 810 according to user-specified instructions by booting the computer 808, re-installing the software, adding corrective code to the software, or otherwise eliminating the malfunction. In an alternative embodiment, the recovery medium 802 is accessible by the computer 808 via a network.

In one embodiment, the user uses the recovery medium 802 on a reference computer to recover from software failure on the reference computer and other computers. The other computers are either locally or remotely accessible by the reference computer. In this manner, the recovery medium 802 can be used to automate correction of specific, similar problems on any number of computers. For example, after recovering one computer from failed software, the script 806 can apply a patch to all other computers identified to the script 806.

In alternate embodiments, the reduced OS image 804 with the script 806 interacts with one or more computers to perform various tasks. For example, the tasks include backing up and/or restoring data on the computers, remotely troubleshooting the computers from a centrally located server executing the reduced OS image 804, and using the reduced OS image 804 as a thin client on a remote server for the computers. Another example includes executing antivirus software from a read-only medium to disinfect the affected files on another OS image and replacing the affected files on the other OS image with the correct version of the affected files from the reduced OS image or an installation OS image on a read-only medium.

In view of the above, it will be seen that the several advantageous results of the invention are attained. As various changes could be made in the products and methods without departing from the scope of the invention, it is intended that all matter contained in the above description and shown in the accompanying drawings shall be interpreted as illustrative and not in a limiting sense.

What is claimed is:

1. A computerized method comprising:
providing a user with access to a text-based script;
editing, by the user, the text-based script to provide a user-customized, text-based script;
booting a first computer from a reduced operating system image on a tangible computer readable medium, wherein said reduced operating system image is of a full operating system image of a second computer having a hardware independent of the first computer; and
performing one or more functions on the first computer according to the user-customized, text-based script, wherein the computerized method is architecture independent.

2. The computerized method of claim 1, wherein performing comprises installing a frill operating system image on the first computer.

3. The computerized method of claim 2, wherein the first computer includes a mass storage device and wherein performing comprises partitioning the mass storage device.

4. The computerized method of claim 2, wherein the first computer includes a mass storage device and wherein performing comprises formatting the mass storage device.

5. The computerized method of claim 4, wherein formatting comprises formatting the mass storage device with a file system in a format supported by the reduced operating system image.

6. The computerized method of claim 2, wherein performing further comprises validating the hardware of the first computer.

7. The computerized method of claim 6, wherein the reduced operating system image includes protected mode hardware drivers operable in a protected mode of the reduced operating system image, wherein validating comprises:
  prior to installing, validating the hardware using protected mode hardware drivers.

8. The computerized method of claim 2, wherein installing comprises copying one or more files associated with the full operating system image to the first computer and integrating the files.

9. The computerized method of claim 8, wherein the script identifies a plurality of steps in which the files are copied and integrated and wherein the script identifies the sequence in which the plurality of steps are executed.

10. The computerized method of claim 1, wherein the first computer has a 64-bit architecture.

11. The computerized method of claim 1, wherein the first computer has an architecture greater than 32-bits.

12. The computerized method of claim 1, wherein booting comprises:
  setting a flag; and
  responsive to the set flag, enabling functionality within the reduced operating system image.

13. The computerized method of claim 12, further comprising allowing user mode software to perform configuration responsive to the set flag.

14. The computerized method of claim 12, wherein functionality includes loading configuration information into volatile memory.

15. The computerized method of claim 1, wherein the computer readable medium includes the script.

16. The computerized method of claim 1, wherein the script is remote from the computer readable medium.

17. The computerized method of claim 1, wherein performing comprises recovering the computer from failure of software.

18. The computerized method of claim 17, wherein the software includes an operating system or an application program.

19. The computerized method of claim 1, wherein the computer readable medium is accessible by the computer via a network.

20. The computerized method of claim 1, further comprising editing the user-customized, text-based script so that performing installs another operating system.

21. One or more computer readable media having computer-executable instructions for performing the method recited in claim 1.

22. The full operating system image on the first computer resulting from the computerized method of claim 2.

23. A system comprising:
  means for editing, by a user, a text-based script to provide a user-customized, text-based script;
  means for booting a first computer from a reduced operating system image on a tangible computer readable medium, wherein said reduced operating system image is of a full operating system image of a second computer having hardware independent of the first computer, and said reduced operating image is hardware independent; and
  means for performing one or more functions on the first computer according to the user-customized, text-based script to install the reduced operating system image on the first computer.

24. A computerized method comprising:
  providing a user with access to a text-based script;
  editing, by the user, the text-based script to provide a user-customized, text-based script;
  booting a first computer from a reduced operating system image on a tangible computer readable medium, wherein said reduced operating system image is of a full operating system image of a second computer having a hardware independent of the first computer; and
  installing a full operating system image on the first computer according to the user-customized, text-based script, wherein booting and installing include only one re-boot of the computer and the computerized method is architecture independent.

25. The computerized method of claim 24, wherein the script is located on the computer readable medium.

26. The computerized method of claim 24, further comprising validating the hardware of the first computer.

27. The computerized method of claim 24, wherein the first computer includes a mass storage device and wherein installing comprises formatting the mass storage device.

28. The computerized method of claim 24, wherein installing comprises copying one or more files associated with the fill operating system image to the first computer and integrating the files.

29. The computerized method of claim 28, wherein the script identifies a plurality of steps in which the files are copied and integrated and wherein the script identifies the sequence in which the plurality of steps are executed.

30. The computerized method of claim 24, wherein the first computer includes the computer readable medium.

31. A system comprising:
  a first operating system image with operating system components selected by a user, said first operating system image being hardware independent;
  a first computer having a second operating system image, said first operating system image being reduced relative to said second operating system image; and
  a text-based script file customizable by a user which interacts with the first operating system image to install the second operating system image on a second computer having hardware independent from the first computer, wherein said text-based script file includes text editable by a user.

32. The system of claim 31, wherein each of the operating system components comprises at least one file.

33. The system of claim 31, wherein the operating system components include hardware drivers.

34. The system of claim 31, wherein the second operating system image includes a plurality of operating system components and wherein the first operating system image includes a subset of the plurality of operating system components.

35. The system of claim 31, wherein the second computer has a 64-bit architecture.

36. The system of claim 31, wherein the script file is operative on a computer having an architecture greater than 32-bits.

37. A tangible computer readable recovery medium for use with a first computer, having a full operating system image, and for use with a second computer comprising:
  a reduced operating system image of the full operating system image of the first computer wherein the reduced operating system image is hardware independent; and
  a text-based script file which interacts wit the reduced operating system image to direct recovery from failure of software on the second computer, and wherein said text-based script file includes text editable by a user, and the second computer has hardware independent from the first computer.

38. The computer readable recovery medium of claim 37, wherein the software includes another operating system image.

39. A computerized method comprising:
  selecting a subset of operating system components from a plurality of operating system components of a first computer based on a desired functionality to be enabled;
  generating a list of files associated with the selected subset of operating system components, said generated list of files being text-based and editable by a user; and
  installing the selected subset of operating system components on a tangible destination medium as the reduced operating system image, wherein installing includes copying the files from an installation medium to the tangible destination medium; and
  using the tangible destination medium to boot a second computer having hardware independent from the first computer, wherein the computerized method is architecture independent.

40. The computerized method of claim 39, wherein the operating system components include hardware drivers.

41. The computerized method of claim 39, further comprising creating at least one hive, wherein installing includes copying the created hives to the destination medium.

42. The computerized method of claim 39, wherein installing further comprises integrating the files on the destination medium.

43. The computerized method of claim 39, further comprising selecting additional operating system components, and wherein installing comprises installing the additional operating system components on the destination medium.

44. One or more computer readable media having computer-executable instructions for performing the method recited in claim 39.

45. The reduced operating system image on the destination medium resulting from the computerized method of claim 39.

46. A system comprising:
  means for selecting a subset of operating system components from a plurality of operating system components of a first computer based on a desired functionality to be enabled;
  means for generating a list of files associated with the selected subset of operating system components, said generated list of files being text-based and editable by a user; and
  means for installing the selected subset of operating system components on a tangible destination medium as the reduced operating system image which is hardware independent, wherein installing includes copying the files from an installation medium to the tangible destination medium;
  means for using the tangible destination medium to boot a second computer having hardware independent from the first computer.

47. A system for creating a reduced operating system image on a tangible destination medium from a plurality of operating system components, said system comprising:
  at least one application program which, when executed by one or more processors on a computer, causes the one or more processors to perform acts including allowing a user to select a set of operating system components from the plurality of operating system components of a first computer and generating a list of files associated with the selected set of operating system components, said selected operating system components being selected to enable a desired functionality, said generated list of files being text-based and editable by the user; and
  operating system component modifications which allow the selected set of operating system components to execute as the reduced operating system image on a second computer wherein the reduced operating system image is hardware independent and the second computer has hardware independent from the first computer.

48. The system of claim 47, further comprising a text-based script for directing performance of one or more functions by the reduced operating system image.

49. The system of claim 48, wherein the functions include one or more tasks selected from the group consisting of: recovering the second computer from software failure, backing up and/or restoring data on the second computer, remotely troubleshooting the second computer, and using the computer executing the application program as a remote thin client for the second computer.

50. The system of claim 47, wherein the set of operating system components is a subset of the plurality of operating system components.

51. The system of claim 47, further comprising additional operating system components not present in the plurality of operating system components, and wherein the application program, when executed, further causes the one or more processors to perform acts including allowing the user to add at least one of the additional operating system components to the selected set of operating system components.

52. The system of claim 47, wherein the operating system component modifications include writing state information to volatile memory.

53. The system of claim 47, wherein the application program, when executed, further causes the one or more processors to perform acts including generating the reduced operating system image.

54. The system of claim 47, wherein the application program, when executed, further causes the one or more processors to perform acts including creating at least one hive.

55. The system of claim 23, wherein the means for editing comprises an application program.

* * * * *

UNITED STATES PATENT AND TRADEMARK OFFICE
CERTIFICATE OF CORRECTION

PATENT NO. : 6,993,642 B2  
APPLICATION NO. : 09/912864  
DATED : January 31, 2006  
INVENTOR(S) : Ryan Burkhardt et al.

Page 1 of 1

It is certified that error appears in the above-identified patent and that said Letters Patent is hereby corrected as shown below:

On page 2, item (56), under "U.S. Patent Documents", in column 1, line 7, below "2004/0218902 A1 11/2004 Yanagita" insert -- 2002/0174329 A1 11/2002 Bowler et al. --.

On page 2, item (56), under "Foreign Patent Documents", in column 1, line 2, after "7/1997" insert -- G06F 09/06 --.

In column 3, line 42, delete "medium" and insert -- medium. --, therefor.

In column 3, line 46, delete "medium" and insert -- medium. --, therefor.

In column 3, line 50, delete "image" and insert -- image. --, therefor.

In column 7, line 36, delete "mare" and insert -- more --, therefor.

In column 11, line 57, delete "Mini\NT." and insert -- MiniNT. --, therefor.

In column 19, line 2, in Claim 2, delete "frill" and insert -- full --, therefor.

In column 20, line 40, in Claim 28, delete "fill" and insert -- full --, therefor.

In column 21, line 15, in Claim 37, delete "wit" and insert -- with --, therefor.

Signed and Sealed this

Twenty-first Day of July, 2009

JOHN DOLL  
*Acting Director of the United States Patent and Trademark Office*